Patented June 6, 1944

2,350,851

UNITED STATES PATENT OFFICE 2,350,851

POLYAMIDE ARTICLES

Wilhelm Wehr, Eilenburg, Germany; vested in the Alien Property Custodian

No Drawing. Application January 18, 1941, Serial No. 375,092. In Germany December 15, 1939

5 Claims. (Cl. 18—55)

My present invention relates to improved articles such as tubes, rods and the like from polyamides.

For the working up of the polyamides, i. e. the compounds prepared by condensing bifunctional reactants, for instance ω-aminocarboxylic acids having at least five carbon atoms between the amino and carboxyl groups and their amide-forming derivatives thereof or α,ω-diamines having at least four carbon atoms between the amino groups with dicarboxylic acids, one takes advantage of the fusibility of these linear highly polymerized products. The molten polyamides are capable of being formed into foils, films, plates, tubes, rods, threads, ribbons and the like by casting, pressing or injection moulding. As the polyamides generally possess very high melting points and partly are sensitive to oxygen at raised temperatures, these kinds of working up require especial precaution. The polyamides can also be worked up with the aid of solvents. However, it is of disadvantage that in contrast with other substances as, for instance, the cellulose derivatives, there are only few solvents or mixtures of solvents for the polyamides.

My invention has for an object to provide a new method especially suitable for the working up of polyamides.

Other objects of this invention will become apparent from the reading of the detailed description following hereinafter.

I have found that the polyamides can simply be worked up to produce foils, films, tubes, rods and the like if they are first soaked in an organic liquid containing in its molecule at least one hydroxyl group and being preferably diluted with water, then freed from the excess of the liquid and finally fused at elevated temperature, if necessary under pressure. As has been surprisingly discovered, soaked polyamide the increase in weight of which amounts to 10–70% fuses almost immediately at raised temperature within narrow temperature limits whereby a homogeneous mass is obtained. The temperature interval is dependent on the nature and quantity of the used liquid containing a hydroxyl group and is far below the melting interval of the "dry" polyamide. The appearance of the polyamide is not changed by the swelling treatment, apart from the increase in thickness. A polyamide having a melting point of 180–185° C. already fuses at about 75° C. when soaked with ethanol of 70% strength. The more water the alcohol, which serves as the swelling agent, contains, the lower the soaked polyamides will fuse. When the heat is not simultaneously added on all sides, an escape of the swelling agent distributed in the melt can be only avoided under a lower pressure while melting.

Owing to the process of this invention it is possible to work up the polyamides into blocks in the apparatus usual in the Celluloid industry; the blocks in turn are cut to plates of any thickness by means of usual cutting devices. Since the linear polyamides can be dried to form foils, films and the like in the same way as cellulose derivatives I have succeeded in substituting for Celluloid new substances which have a much higher softening point than Celluloid. The number of fields of application for foils and the like from artificial materials is increased thereby owing to the high melting point; for the hitherto known artificial materials generally have a melting point of below 100° C.

The more detailed practice of the invention is illustrated by the following examples. There are of course many forms of the invention other than these specific embodiments.

Example 1

For the production of foils, plates and the like a piece of an interpolyamide prepared by condensing, for instance, hexamethylenediamine and adipic acid with ε-caprolactam, about 1 kg. in weight, 3 times 2 square centimeter in size and 0.5–3 mm. in thickness is caused to swell in 2 kg. of ethanol of 80% strength at 15–25° C. During swelling the mixture may be moved to distribute the swelling agent. After about three days the excess of liquid is removed and the polyamide, which has absorbed 40–50 per cent. by weight of liquid and still is the same size as the untreated piece but is somewhat thicker, is placed in a boiling press usual in the Celluloid industry. The melting of the swollen polyamide is carried out at a temperature of about 50° C. produced by water of about 100° C. It is convenient first to fuse the polyamide in open boiling press before a slight pressure is employed, whereby a compact structure is readily obtained in the forming block.

After cooling the block is worked up into foils by a customary Celluloid cutting machine. The surface of the foils when dried may be polished. It is of advantage to soften the surface slightly with a suitable swelling agent before the foils are treated in the usual polishing press.

The soaked polyamide may also be fused to form a so-called round block which serves for the manufacturing of ribbons, rods or threads by means of apparatus and tools known in the Celluloid industry.

Example 2

About 1 kg. of the interpolyamide described in Example 1 is soaked with 2 kg. of methanol of about 65% strength at 15–25° C. After pouring off the swelling liquid, the polyamide the weight of which has increased by about 35% is put in the piston room of a press for making tubes whereupon the press is closed at the mouthpiece as well as at the end of the piston. The fusion of the mass is carried out at 70° C. The polyamide homogeneously melted is then molded into tubes by using the usual mouthpieces. Owing to their great resistance to bacteria the transparent tubes as clear as glass are especially suitable for use in food industry, in breweries, for beer pipes and also artificial skins for sausages. Moreover, they are a useful raw material for manufacturing medical instruments as, for instance, cannulas, catheters or syringes since they are resistant to boiling water when completely dried and accordingly readily to be sterilized.

As the polyamides are unbreakable and very resistant to many organic solvents they may also be used for apparatus of the chemical industry, for instance, for sight glasses or devices for indicating the level of liquids.

It is also possible to cut open the tubes, especially after the mass has been carefully filtered before leaving the mouthpiece of the press, to obtain an extremely valuable raw material for the production of compound glass. Further, the foils may be employed as "organic glass," for instance, for greenhouses, disinfecting cases and windows for breathing apparatus and the like.

Finally it is also possible to choose the diameter of the holes, through which the mass is extruded, so small as to form very thin solid or hollow threads, ribbons, and bristles for the manufacture of fabric, artificial horsehair, brushes and the like.

Example 3

Instead of the press for making tubes as used in Example 2 presses otherwise shaped may also be employed, for instance, apparatus as usual for moulding artificial resins. It is thus possible to work up the swelled polyamide mass in exactly dosed amounts directly into finished products without that temperatures of above 110° C. are necessary. This fact is of great advantage inasmuch as it is possible to produce completely colorless finished products as clear as glass and having valuable mechanical properties. After a short period of drying the polyamide again exhibits the original high softening point.

Example 4

10 kg. of an interpolyamide from hexamethylenediamineadipate and ε-caprolactam are soaked in 10 kg. of isobutanol of 95% strength till a test exhibits a uniform distribution and a content of about 25% of the swelling agent. When this stage has been reached, the mixture is fused at a temperature close below the boiling point of the azeotropic mixture of isobutanol-water. The molten mass is then worked up on cold (about 20° C.) drums having a peripheral speed of 5 m./minute to produce foils having a thickness of about 0.05 mm. The foils are subsequently dried and, if desired, polished or deadened.

The thickness of the foils thus produced may be varied between about 0.09 and 0.02 mm. by adjusting the distance of the drums. The number of the passages through the drums depends upon the difference between the temperatures of the molten mass and the surface of the drums. The lower the temperature of the drum, the more readily the rapidly solidifying mass can be worked up into thin foils and the lower is the number of the necessary passages through the drums. At a difference of temperature of more than 30° C. one passage already suffices, especially if the peripheral speed of the drums is 2–15 m./minute. The velocity of the solidifying of the melt can be regulated by changing the swelling agents and in particular by adjusting the water content of the swelling liquid. It is also convenient to adjust the temperature of the melt before it passes through the cooled drums.

The thin foils obtained according to Example 4 and having a high softening point are used as wrapping materials and insulating materials, furthermore, when cut into ribbons, for the manufacture of plaited goods, artificial straw and the like.

Instead of aqueous alcohols other liquids containing hydroxyl groups may also be used as swelling agents as, for instance, the ethers of ethyleneglycol, if desired, mixed with alcohols, or mixtures of alcohols with other organic liquids.

By adding dyestuffs to the swelling agents the polyamide products may also be dyed. Products opaquely dyed may be prepared by forming the dyestuffs in a manner known per se by way of double reaction in the swelling parts of the polyamide. In this case it is merely necessary to cause the reactants employed for the double reaction to act successively and dissolved in two swelling liquids which may be similar or different.

Sometimes it is convenient to add softening agents to the swelling liquids.

I claim:

1. A process for producing foils, tubes, rods and the like from polyamides which comprises soaking a polyamide with a low boiling saturated aliphatic alcohol at a temperature of at most about 30° C., then freeing the polyamide thus treated from said alcohol not absorbed by said polyamide, subsequently fusing the alcohol-treated polyamide at raised temperature, but considerably below the melting point of the untreated polyamide, and working up the melt into the desired article.

2. A process for producing foils, tubes, rods and the like from polyamides which comprises soaking a polyamide with a mixture of water and a low boiling saturated aliphatic alcohol at a temperature of at most about 30° C., then freeing the polyamide thus treated from said mixture not absorbed by said polyamide, subsequently fusing the alcohol-treated polyamide at raised temperature, but considerably below the melting point of the untreated polyamide, and working up the melt into the desired article.

3. A process for producing foils, tubes, rods and the like from polyamides which comprises soaking a polyamide with a mixture of water and a low boiling saturated aliphatic alcohol at a temperature of at most about 30° C. until the increase in weight of the polyamide amounts to 30–70%, then freeing the polyamide thus treated from said mixture not absorbed by said polyamide, subsequently fusing the alcohol-treated polyamide at raised temperature, but considerably below the melting point of the untreated polyamide, and working up the melt into the desired article.

4. A process for producing foils, tubes, rods and the like from polyamides which comprises soaking a polyamide with a mixture of water and a low boiling saturated aliphatic alcohol at a temperature of at most about 30° C. until the increase in weight of the polyamide amounts to 30–70%, then freeing the polyamide thus treated from said mixture not absorbed by said polyamide, subsequently fusing said polyamide at a temperature of at most about 110° C., and working up the melt into the desired article.

5. A process for producing foils, tubes, rods and the like from interpolyamides which comprises soaking the interpolyamide from hexamethylenediamineadipate and ε-caprolactam with a mixture of water and a low boiling saturated aliphatic alcohol at a temperature of, at most, about 30° C. until the increase in weight of the interpolyamide amounts to 30–70%, then freeing the interpolyamide thus treated from the excess of the mixture of water and alcohol, subsequently fusing the said polyamide at a temperature of, at most, about 110° C., and working up the melt into the desired article.

WILHELM WEHR.